United States Patent [19]

Komori et al.

[11] Patent Number: 4,835,576

[45] Date of Patent: May 30, 1989

[54] OPAQUING METHOD AND APPARATUS THEREOF

[75] Inventors: Keiji Komori; Masaru Ohta; Takashi Sawada; Masaaki Matsuo, all of Tokyo, Japan

[73] Assignee: Toyo Ink Mfg. Co., Ltd., Tokyo, Japan

[21] Appl. No.: 108,474

[22] Filed: Oct. 14, 1987

[30] Foreign Application Priority Data

Oct. 17, 1986 [JP] Japan ..................... 61-245502
May 29, 1987 [JP] Japan ..................... 62-131368

[51] Int. Cl.[4] ..................... G03B 27/52
[52] U.S. Cl. ..................... 355/40; 355/77; 355/80; 355/81
[58] Field of Search ..................... 355/40, 80, 81, 77

[56] References Cited

U.S. PATENT DOCUMENTS 3,537,788 11/1970 Young ..................... 355/80
3,687,887 8/1972 Zabiak ..................... 355/40
4,012,122 3/1977 McVeigh ..................... 355/40

*Primary Examiner*—Monroe H. Hayes
*Attorney, Agent, or Firm*—Martin A. Farber

[57] ABSTRACT

In the negative form of lith type film or photographic printing paper, the ground part is light-untransmissible and image part (letter, pattern) is light-transmissible. Apart from them, pinholes and stains also constitute light-transmissible areas. Although the light-transmissible areas of letter and pattern are necessary, the light-transmissible areas of pinhole and stain are unnecessary. Thus, the unnecessary light-transmissible areas must be distinguished from the necessary light-transmissible areas, and an opaque layer must be provided on the unnecessary areas to make them opaque. Generally, however, the unnecessary light-transmissible areas are minute and many in number, so that their detection and opaquing is a very laborious work. Thus, according to the opaquing method of the present invention, only the necessary light-transmissible area is detected and the other light-transmissible areas are regarded as unnecessary and the latter are stopped out. Otherwise, unnecessary light-transmissible areas are detected, and they are stopped out. The opaquing apparatus of the invention is equipped with a means for exposing a lith type film or a photographic printing paper to light, a means for detecting necessary light-transmissible area, and a means for providing an opaque layer on the unnecessary light-transmissible areas detected by the detecting means.

7 Claims, 2 Drawing Sheets

FIG. 3
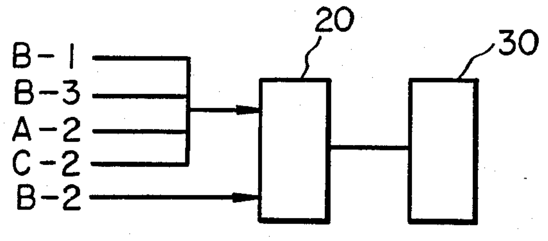
FIG. 4A
FIG. 4B
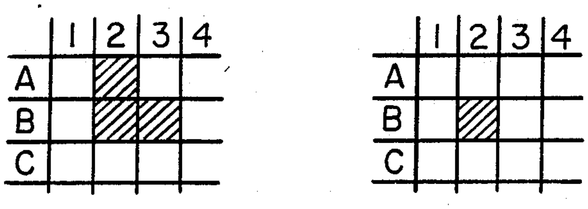
FIG. 5-I
FIG. 5-II
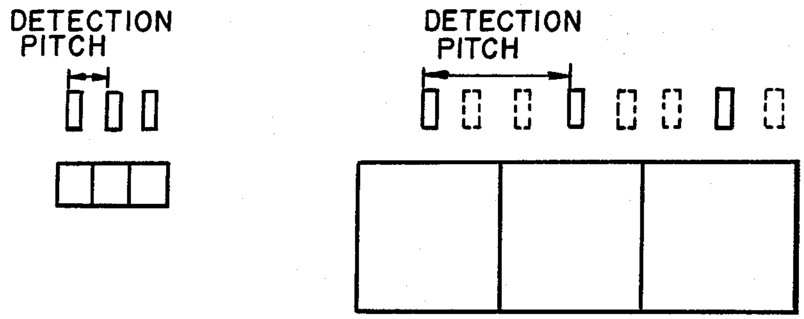
FIG. 6
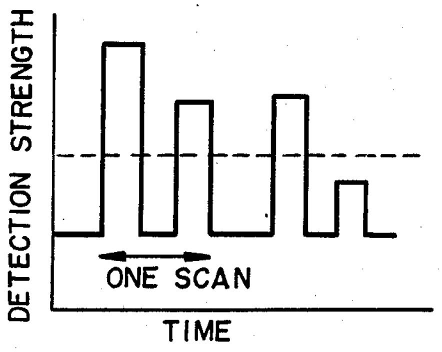

OPAQUING METHOD AND APPARATUS THEREOF

BACKGROUND OF THE INVENTION

1. Field of the Invention

The present invention relates to a method for detecting, in lith type film or photographic printing paper or the like, the image area, i.e. the necessary light-transmissible or reflecting area or detecting unnecessary light-transmissible or reflecting areas and providing an opaque layer on the areas other than the necessary light-transmissible or reflecting area or on the unnecessary light-transmissible or reflecting areas to make the unnecessary light-transmissible areas opaque, as well as to an apparatus therefor. Further, the invention relates to an apparatus for detecting, in an image formed on lith type film or photographic printing paper, the necessary light-transmissible or reflecting area at a detecting pitch meeting with the picture element unit and opaquing other light-transmissible or reflecting areas, i.e. unnecessary light-transmissible or reflecting areas.

2. Description of the Prior Art

As the opaquing method or stopping out of lith type films or photographic printing papers or the like which is a work for making opaque to the unnecessary light-transmissible or reflecting areas (defective areas) appearing due to the adhesive agent, the stain of block-copy layout sheet or stain of light exposing device or a work for classifying image areas by color, mask sheet method and opaque ink coating method have hitherto been known. Examples of the unnecessary light-reflecting area include black staines on a white ground, such as those in positive photographic printing paper. In the mask sheet method, a peelable red colored layer formed on polyethylene terephthalate film is cut into desired shape and superposed on the object to stop out the object. In the mask sheet method, the sheet is cut so as to meet with the size of lith film or photographic printing paper, registering pinholes are provided, and then it is put to use. This mask sheet method is very simple and convenient, because the unnecessary light-transmissible or reflecting areas can be made opaque rapidly by cutting the mask sheet while retaining it so as to meet with the registered position of lith film or photographic printing paper and then peeling off the red colored layer. If desired, two or three mask sheets are superposed, whereby a finer opaquing work can be practised. However, this method is disadvantageous in that the opaquing work is almost always a manual work so that the use of mask sheet increases the number or works, the cutting and peeling works are difficult to practise, and the scattering of light caused by the thickness of mask sheet deteriorates the quality of manuscript and letters formed from the lith type film or photographic printing paper. Further, it is unsuitable for opaquing the unnecessary light-transmissible or reflecting areas, because of high cost of mask sheet and low workability of this method.

In the opaque ink method, an opaque ink (stopping out ink) prepared by dispersing an opaque agent such as carbon black into a vehicle is used. This method is superior to the mask sheet method in that the formed opaque layer is small in thickness. This method is desclosed in Japanese Patent Kokai Gazette (Laid-Open) Nos. 91236/81, 6850/82 and 108853/82, for example. Although the methods disclosed therein are superior to the prior opaque ink methods in that a hard film can be formed and the visual evaluation of coated areas can be facilitated by mat effect, it is a manual work using a hair pencil so that fine opaquing work is difficult to practise and the work is laborious.

As opaquing methods other than the mask sheet method and the opaque ink method, the masking paper method which comprises applying a previously colored adhesive tape to the area to be stopped out and the method which comprises applying a light-untransmissible or unreflecting sheet (e.g. paper) to lith film or photographic printing paper can be referred to. All these opaquing methods by application are much disadvantageous in that they are very laborious manual works although they can realize the opaquing, they can correct only a large area. Thus these methods are used in the practical plate-making works only in some limited cases.

As above, in the prior means for opaquing the unnecessary light-transmissible or reflecting areas in lith film or photographic printing paper, almost all the works have been carried out by human hand, and all the improvement thereof so far studied are nothing other than a mere reinforcement of opaque or a means applicable only to limited cases.

As for the detection of unnecessary light-transmissible or reflecting areas in lith films and photographic printing papers or the like, the prior means therefor has been a visual detection by the use of human eyes, which is disadvantageous in that it takes a long period of time and it requires a skillfulness. In many case, the unnecessary light-transmissible or reflecting areas are pinholes, stains or lines. Such unnecessary areas are many in number and their detection is quite laborious at the present stage. In many cases, the areas to be stopped out are found in the small areas between letters and patterns.

As for the apparatus for detecting the unnecessary light-transmissible or reflecting areas in lith type films and photographic printing papers, printed matter testing apparatus and printing circuit testing apparatus can be referred to. In these apparatuses, the standard sample of test is converted to an image by television camera or the like, the image is memorized by an electronic (or electric) memory device, and image of each actual sample is compared with that of standard sample by scanning method or other appropriate method.

Such apparatuses are mentioned in Japanese Patent Kokai Gazette (Laid-Open) Nos. 250957/85, 250958/85, 12341/86, 12343/86 and 12345/86, for example. Although these apparatuses are advantageous in that they can rapidly and stably practise the test or input of information for the test and can realize a rationalized production of printed matters, they cannot detect the unnecessary light-transmissible or reflecting areas in lith type films and photographic printing papers, because there is no standard sample for these defects, i.e. the standard sample is the blockcopy layout sheet unusable in the test. Thus, it has been desired to developed an apparatus for opaquing the unnecessary light-transmissible or reflecting areas without referring to the standard sample.

Further, an apparatus which can stop out an area smaller than the size of picture element of image has been desired.

Thus, a mere combination of prior opaquing method and known printing matter testing apparatus is insufficient in functionality when used for detection of the unnecessary light-transmissible or reflecting areas in lith type films or photographic printing papers, and such a combination is technically difficult to operate. Further, such an apparatus is expensive.

SUMMARY OF THE INVENTION

In view of the above-mentioned disadvantages of prior methods, the object of the present invention consists in providing an opaquing method in plate-making work by which the unnecessary light-transmissible or reflecting areas can be made opaque. For this object, the opaquing method of the present invention comprises, in a method for opauqing the areas other than the necessary light-transmissible or reflecting areas constituting the image in a lith type film or a photographic printing paper or the like, instructing the detected unnecessary area or the areas other than necessary area into an opaquing apparatus and forming an opaque layer on a part or the whole of the areas other than the necessary light-transmissible or reflecting area constituting a image in lith type film or photographic printing paper or the like by means of an opaquing apparatus.

Further, the opaquing apparatus of the present invention is characterized, in an apparatus of opaquing the areas other than the necessary light-transmissible or reflecting areas constituting image area in a lith type film or phothgraphic printing paper or the like on which an image has been formed, in that it has a means for exposing the film or the photographic printing paper to light, a means for detecting the necessary area at a pitch meeting with picture element unit, and a means for providing an opaque layer on the unnecessary areas other than the area detected by the detecting means.

Other objects of the present invention will become apparent from the descriptions presented below.

BRIEF DESCRIPTION OF THE DRAWINGS

FIG. 3 is a diagram illustrating the construction of judging apparatus;

FIGS. 4A and 4B are each a conceptional diagram illustrating the method for detecting unnecessary light-transmissible or reflecting areas;

FIGS. 5-I and 5-II are each a conceptional diagram illustrating the detection pitch in detecting the unnecessary light-transmissible or reflecting areas; and FIG. 6 is a graph illustrating the detectable intensity of light.

DESCRIPTION OF THE PREFERRED EMBODIMENTS

Figure 1:
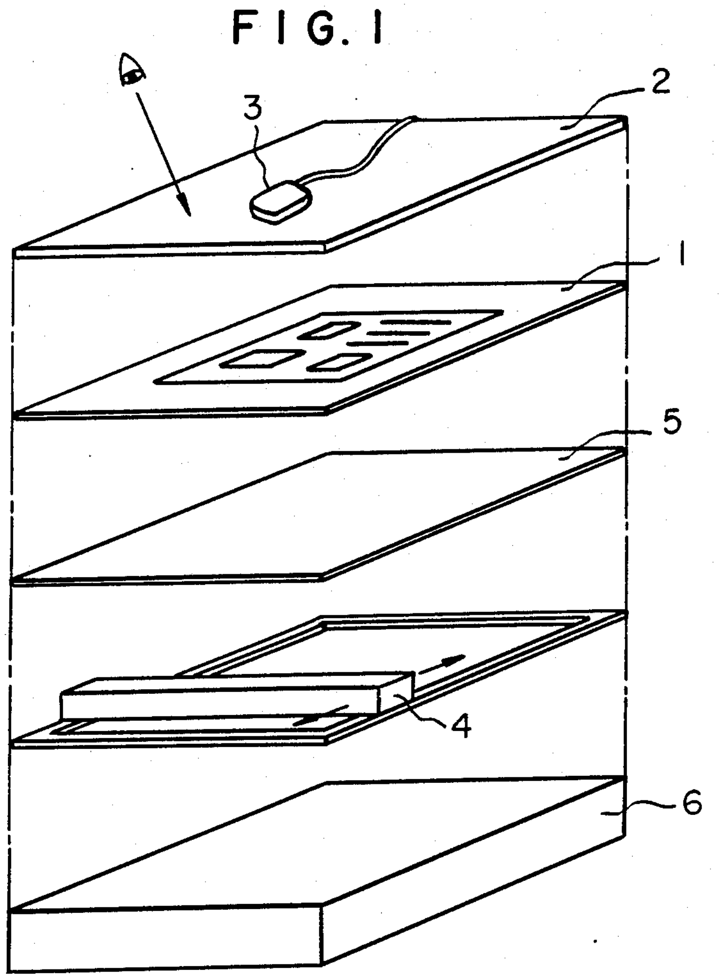
FIG. 1 is an outlined perspective view illustrating one embodiment of the opaquing method of the invention.

The present invention provides a method for partially or wholly opaquing the areas other than the necessary light-transmissible or reflecting areas constituting the image area in a lith type film or photographic printing paper or the like on which an image has been formed which comprises instructing the detected unnecessary light-transmissible or reflecting areas or the areas other than the necessary area into an opaquing apparatus and forming an opaque layer on the areas other than the necessary light-transmissible or reflecting area constituting the image area on lith type film or photographic printing paper by means of an opaquing apparatus, and further to an opaquing method wherein the opaquing apparatus is a thermal transfer recording apparatus.

Taking notice of the fact that the unnecessary light-transmissible or reflecting areas in a lith type film or photographic printing paper or the like can be stopped out by detecting the formed image (necessary area) and opaquing the other areas (i.e., unnecessary areas), and considering that detection of minute unnecessary light-transmissible or reflecting areas requires much labors, requires a large and complicated detector, requires a large memory capacity and results in a drop in opaquing velocity, the inventors have discovered an apparatus for detecting the necessary image area and opaquing the areas other than the necessary area, i.e. unnecessary areas, by an image-forming means such as thermal transfer recording, ink jet, electrophotography and the like by which a plate can be made more simply, more rapidly and with a higher accuracy than in the prior mask sheet method or opaque ink method without needing any skillfulness. Thus, the invention relates to an apparatus for opaquing the areas other than the necessary area having, in an apparatus for opaquing the areas other than the necessary light-transmissive or reflecting area constituting the image area on a lith type film or photographic printing paper or the like on which an image has been formed, or unnecessary light-transmissible or reflecting areas, a means for exposing the film or photographic printing paper to light, a means for detecting the necessary or unnecessary area at a pitch meeting with the picture element unit, and a means for providing an opaque layer on the areas other than the detected necessary area by means of the detecting means, or unnecessary areas. Further, the invention also relates to an apparatus having transporting means for sending lith type film or photographic printing paper or the like to the exposing means, detecting means and opaquing means, i.e. an apparatus capable of exposing, detecting and opaquing a lith type film or photographic printing paper or the like while transporting it. Further, it relates to an apparatus for forming an opaque layer on the areas other than necessary area by which an opaque layer is formed on the areas other than an area which has been detected by the detecting means and thickened by adding thereto predetermined number of pictures elements. Further, it also relates to an apparatus which is a detecting means for detecting the necessary area by the picture element conjunction (connection) method. Further, it relates to an apparatus which can determine the pitch of detection by picture element of constant cycle such as by every picture element or by every other picture element.

The apparatus of the invention is an apparatus capable of doing an automated opaquing work. It photoelectrically converts an optical image such as photographic film by means of image sensor or the like, supplies the resulting image signal to opaquing apparatus (treating apparatus), coats the areas other than the necessary area, i.e. pinhole-containing areas, with a coating film according to the signal. Further, it is also possible to carry out only the detection manually and the opaquing work by the apparatus.

According to the method of the invention, necessary area is detected by the human eyes or by an apparatus for the detection with human eyes or by an apparatus and then an instruction is made so as to stop out the other areas. Otherwise, the unnecessary areas are detected, and then an instruction is made so as to stop out these areas involving pinholes.

Depending on the kind of detecting means, unnecessary areas ranging from those smaller than picture element to those greater than letter image can be detected.

As a means for detection and/or instruction, a light source for illuminating the lith type film or photographic printing paper or the like, a television camera equipped with magnifying glass or magnifying device for facilitating the detection, a monitoring device for reproducing the signal from television camera, and the like may be used.

The means for instruction in the invention may be, for example, a cursor or a light pen capable of doing detection and instruction simultaneously, or a means for inputting the signal from the cursor or light pen into computer and instructing it from the computer to opaquing apparatus.

Examples of the lith type film and phothgraphic printing paper or the like to which the invention is applicable include lith type film, photographic printing paper, negative and positive monochronic and color films, blockcopy layout sheet and the like.

The main construction of the apparatus of the invention consists of a detecting or instructing means and an opaquing means. Not only an apparatus involving these two means as a unified structure but also an apparatus in which a detecting or instructing means and an opaquing apparatus are separately involved to form a combination can be used in the invention.

The detected image area constructs a positional information. Thermal head is shifted onto the areas (non-image area) other than the position of image area either manually or automatically, and it does an opaquing work there. In carrying out the opaquing work, the image area and the non-image areas can be distinguished exactly, and opaquing is carried out according to this distinguishment. Since the image formation in the opaquing is generally inferior to the image on lith type film sharpness, it is preferable to carry out the opaquing so as to somewhat thicken the image area and somewhat weaken the opaquing area.

An apparatus in which the detecting means is also automated is mainly constructed of an exposing means, a detecting means, an opaquing means and a transporting means. An apparatus involving 3 or 4 of them as a unified structure, a combination of an opaquing means with an apparatus having exposing means and detecting means, and a combination of separate means are all usable. Usually, a transporting means is provided for the sake of passage through these means. It is also allowable to use a mode in which the exposing and detecting means are moved so as to make scanning instead of conveying the film or photographic printing paper. If desired, size of picture element and its pitch may be varied at will by the use of an inputting means in stead of fixing them at the beginning. Although in many cases the size of picture element is decided by a light-accepting element which is a detecting means, the apparatus may be so constructed as to enable its alternation. As a simple method for it, the apparatus may be so constructed as to alter the size to multiples of light-accepting element. Although detecting pitch is usually by every picture element, detection by every other picture element is also possible. The pitch of detection may be either fixed or variable.

As the means for input, any means can be used so far as it enables to input the picture element size. Key board, scanner and the like are usually used.

As the exposing means, any means may be used so far as it enables to accept light with the light-accepting element in the detecting means. LED array, tungsten lamp, fluorescent lamp, xenon lamp and the like can be used. As the light-accepting element in the detecting means, various ones can be used. For example, CCD contact image sensor, photomultiplier, photoelectroconductive camera tube such as Vidicon, photodiode, photo transistor, solar cell and the like can be used. Particularly excellent light-accepting elements are CCD contact sensors such as CIPS304MSI manufactured by Toshiba, because they can realize a high speed passage of lith type film or photographic printing paper through detecting means. Examples of camera tube include Vidicon, Pravicon (manufactured by Phillips, Matsushita Denki Sangyo), Saticon (NHK, Hitachi), Calnicon (Toshiba), New Vicon (Matsushita Denki Sangyo), Silicon Vidicon (RCA) and the like, and examples of CCD include those of IL style (interline style) and those of FT style (frame transfer style), and the like.

An light-accepting element preferably usable in the invention has the following functions:

(1) a photoelectric conversion in the whole or partial wavelength range of 200 to 800 nm;

(2) a minimum reading-out size of 0.01 to 0.50 mm;

(3) variable gradation characteristics.

Further, if desired, it has single or plural magnifying or reducing lens(es) at the light inlet of light-accepting element. The light-accepting element usable in the invention is not limited to the above-mentioned ones, so far as it has a part or the whole of the above-mentioned functions and photoelectric conversion characteristics.

In carrying out detection, an appropriate magnifying or reducing lens system may be used, if necessary, by which detecting ability can be improved and apparatus can be simplified. By changing the lens system used, the resolution or the extent of detection of necessary area can be varied.

Detection of the picture element of lith type film or photographic printing paper or the like is carried out by scanning the surface of lith type film or photographic printing paper by picture element by the use of light-accepting element.

By retaining the information of scanning by some means during at least one scanning line and previously setting up that, for example, the non-independent picture element in scanning line is the necessary light-transmissible or reflecting area, it can be detected. Accordingly, necessary area can be identified by investigating and examining the picture element informations given by one or more scanning line(s). Thus, in the image which is originally a necessary area, the picture elements do not exist independently, Those existing independently are unnecessary areas. This can be judged in the light of informations given by the neighboring picture elements (before and behind, or left and right).

In lith film or the like conssiting of a constant size of image, such as letters unnecessary areas larger than unit image can be recognized as an unnecessary area when the unit image exists as a continuous image, i.e. when continuation of picture images constitutes an area larger than the unit image.

Originally, the image area on lith type film or photographic printing paper is a continuous area, while the image area in printing plate made from lith type film or photographic printing paper is constituted of halftone dots. Roughly saying, the picture element in lith type film or photographic printing paper corresponds to the half tone dot in printing plate.

In the case of negative form of lith type film or photographic printing paper or the like, the area to be opaque according to the invention is usually light-transmissible area. In the case of positive form, either of light-transmissible area and light-reflecting area can be opaque. Thus, when unnecessary light-transmissible area exists in a necessary image area (thick line, solid area or the like), it is to be stopped out. When black-colored stain exists on a white-colored base as in a positive photographic printing paper, the light-reflecting area is to be stopped out.

The data are fed into image memory at the timing of image scanner, and they are read out at the timing of opaquing apparatus. The data read out of the image memory at the timing of opaquing apparatus are converted to control signal of the head of opaquing apparatus such as thermal printer and the pulse width is controlled, whereby temperature of thermal head is controlled.

In carrying out the identification at the time of detection, investigation and examination may be carried out by 4-conjunction, 8-conjunction or the like of picture elements by a computer treatment. By this conjunction, the picture element constituting the necessary light-transmissible or reflecting area of lith type film or photographic printing paper can be detected. Needless to say, the identification may also be carried out by other methods.

With the detecting means of the invention, a smaller capacity of memory is enough for the purpose, as compared with the case of detecting unnecessary area. Generally saying, in lith type films or the like, the image area occupies a smaller proportion than non-image area and the object of detection is greater than pinhole. Therefore, the detecting means requires no fine sensor density, so that the detecting means of the invention requires as small a memory capacity as 1/5 to 1/20.

The detected image area is stored in the memory device as a positional information, and thereby the area other than it or non-image area is opaque. In carrying out the opaquing, the image area and non-image area are exactly distinguished from each other, and opaquing can be carried out according to this classification. Since the formation of opaque image is generally inferior in sharpness to images on lith type films or the like, it is preferable to somewhat thicken the necessary image area and somewhat weaken the non-image area to be opaque. For this procedure, the brightness gradient of four picture elements and Laplacian of nine picture elements are examined. If absolute value of four picture elements is positive and Laplacian is negative, it can be understood that the edge of necessary picture element resides in the central position of examination, so that the image can be thickened by adding a predetermined number of picture elements as necessary elements around the necessary elements.

After detecting the necessary light-transmissible or reflecting area by the detecting means, an opaque layer can immediately be provided on the other areas of lith type film or photographic printing paper or the like. Preferably, an appropriate distance or time gap is provided between the detecting means and the opaque layer forming means in order to simplify the overall structure of plate making apparatus and facilitating the maintenance work. By this, the detecting means and opaquing means become easily separatable and connectable. In an apparatus in which there is no room for selecting any other procedure than simultaneous practice of detection and opaquing, the operator must carry out the two works in a narrow place and, in addition, construction and connection of apparatuses are difficult to practise. By providing the above-mentioned distance, there arises an allowance, such as connecting only the detecting means just behind the automatic developing machine for lith type film and placing the opaquing means at a site apart from them.

For communicating the positional information from the detecting means to the opaque layer forming means, the following functions must be had, for example:

(1) an electrical (or some other) memorizing means corresponding to at least one scanning line;

(2) a computer suitable for investigating and examining said memorizing means;

(3) a means for providing, according to requirement, an opaque material onto lith type film or photographic printing paper in accordance with the identified positional informations. The means (1) to (3) may be constructed integrally or separately.

An example of the memorizing means corresponding to one or more scanning lines are as follows. Thus, when resolving power in the direction of scanning is 4/mm, the allowable minimum capacity of memory is 8 bits/mm. Preferably, it is a means having a memory capacity of 4 bites/mm.

In order to detect the necessary light-transmissible or reflecting area on a lith type film or photographic printing paper or the like and providing an opaque layer on the other areas, the works from detection to identification of position must be completed before the object of detection (lith type film or photographic printing paper or the like) passing them reaches the opaque layer forming means. The kind of computer process and the treating velocity of the used language (e.g. assembla, etc.) are not critical, so far as they can be completed before the object reaches the opaque layer forming means.

As the opaque layer, a transfer recording from thermal fusion type thermal transfer sheet, a transfer recording or application by means of ink jet, and the like can be utilized. The method of transfer recording and the material therefor are not critical, so far as they are means capable of opaquing the unnecessary areas of lith type film or photographic printing paper with a thin-film material. Preferably, the opaque layer has a durability required in the working environment of lith type film or photographic printing paper after it is transferred or applied to the unnecessary areas of lith type film or photographic printing paper. Thus, an opaque material meeting with the environment should be selected.

As other opaque layer forming means, coating by means of pen plotter using ink, clayon, etc., transfer of printing ink by means of printing process, etc. can be referred to.

Next, one example of opaque material will be mentioned. The thermal transfer material used in the invention is prepared by providing, on a support, a transfer material containing a pigment or a dye and a thermally fusible film-forming material and transferable at a temperature of about 50°-200° C. The pigment or dye fulfils the conditions of opaquing in the light-exposure work constituting the after treatment of lith type film or photographic printing paper. As said thermally fusible film-forming material, wax or other material is used. As the ink used in the transfer or application by ink jet, these consisting of a dye or a pigment, a solvent and a film-forming material such as resin are used.

As the thermal transfer recording apparatus, usual thermal transfer printer can be used. Receiving the positional information, it forms an opaque layer either immediately or after a variable predetermined time gap. When thermal transfer printer is used, the temperature in printer and the temperature of thermal head must be controlled and transfer of the opaque layer required a uniform pressure-applying mechanism. A desired opaque layer can be formed according to the well known technic.

The opaque layer is formed by the transfer from thermally fusible thermal transfer sheet. As the thermal transfer material, a material prepared by forming a thermal transfer layer containing wax and a pigment or a dye on the conventional support, or a material prepared by coating a thermally fusible layer and an ink layer on a support, or a material prepared by forming a thermally fusible layer, an ink layer and a thermally fusible layer is used. Preferably, it is a lamination type thermal transfer material. By using it, the film strength of the opaque layer, i.e. the transfer layer, can be improved and, in addition, its transferability (rate of transfer) can be improved, so that an opaquing free from pinhole can be realized. That is, the opaque layer possesses the necessary durability in the working environment of lith type film or photographic printing paper and can provides an opaque layer meeting with the working environment, after being transferred or applied onto the unnecessary areas of lith type film or photographic printing paper.

The construction of the thermal transfer material used in the invention is support/thermally fusible layer/ink layer or support/thermally fusible layer/ink layer/thermally fusible layer, support/thermally fusible ink layer, or the like.

Next, one example of the thermal transfer material which is one example of the opaque material will be explained. As the support, biaxially stretched polyester film is preferable because of its high dimensional stability to heat and forces, though acetate film, polyvinylchloride film, polypropylene film, polyethylene film and the like are also usable. In order to improve their peelability at the time of transfer, these films may be subjected to a releasing treatment with, for example, silicone resin, fluorine resin, and the like.

As the thermally fusible layer of the thermal transfer material, a material mainly composed of a low molecular weight compound which is thermally fusible and has a film-formability such as waxes, fatty acids, fatty acid amides and the like is used, of which examples include carnauba wax, Montan wax, paraffin wax, microcrystalline wax, polyethylene wax, lauric acid, stearic acid and the like. These thermally fusible compounds are used as the main ingredient, and it is compounded with resin, additives, solvent and the like in accordance with need to prepare a composition. The composition is coated by means of a coating machine or a printing machine according to the method of hot melt coating, gravure coating and the like to form a thermally fusible layer.

The ink layer contains an opaquing coloring material, i.e. a pigment and/or a dye, and further contains a resin as a film-forming component. As the resin, at least one member selected from the group consisting of acrylic resins, styrene resins, phenolic resins, vinyl resins, polyamide resins, cellulosic resins and the like is used. Into the ink layer, plasticizer, surfactant, extender pigment and the like may be incorporated. The ink layer is formed by gravure process, offset process, or the like.

As the opaque coloring material, at least one member selected from organic pigments and dyes is used, of which examples include carbon black, red iron oxide, titanium white, azo, phthalocyanine, quinacridone, perylene, and the like.

The thermally fusible layer is usually formed into a thickness of 0.1 to 10 microns, and the ink layer is formed into a thickness of about 0.1 to 3 microns.

Next, the invention will be illustrated with reference to one embodiment. It is apparent from the description presented above that the invention is not limited by this embodiment.

FIG. 1 is an outlined perspective view conceptionally illustrating the process of the invention. In FIG. 1, the object of test such as glass, lith type film or the like and opaque material are placed apart each other. Actually, however, they are contacted mutually or placed very closely.

The test object 1 which is a lith type film is fixed under the down surface of glass 2 so that it can be irradiated by illuminating light source 6, and the unnecessary areas such as pinhole and the necessary image area are visually detected. In FIG. 1, detection and instruction into thermal head 4 of thermal transfer printer are simultaneously carried out by cursor 3 having an instructing mechanism to form an opaque layer. That is, thermal head 4 shifts according to the positional information instructed by cursor 3, and an opaque layer is provided from opaque material 5 onto the test object 1.

The size of lith type film or photographic printing paper is varied depending on the size of used image, i.e. depending on whether it is used as wayside poster or as catalogue, etc.

In order to meet with the size of test object, the size of thermal head and opaque layer forming means (thermal transfer material) are controlled. If a tape-formed thermal transfer material is used, a narrow area tape can also be treated.

The example of FIG. 1 illustrates a case that instruction of positional information and formation of opaque layer can be practised simultaneously. The opaquing may be carried out after a predetermined lapse of time after instruction. That is, it is allowable to memorize the data of detection and instruction into computer and, when the data corresponding to one sheet of test object have been completed. to start the opaquing work.

The opaquing means has thermal head and thermal transfer material as its main constituent. Thermal head 4 is heated according to the positional informations fed from cursor 3, and the transfer material (opaquing material) is thermally fused and an opaque layer is formed on the detected unnecessary areas.

The thermal transfer material is placed so as to come between thermal head 4 and test object 1, and it preferably has a form of slender tape.

A lith film or the like stopped out with the thermal transfer material of the invention is excellent in adhesive property and abrasion resistance of opaque layer and can realize a complete opaquing. Accordingly, in the after treatment, no peeling takes place even if it is handled in the same manner as in the prior manual opaquing process.

As the thermal transfer material, the following materials A, B, C, D and E were used. They all gave good results.

(Thermal transfer material A)

The following thermally fusible layer composition or ink layer composition was preliminarily mixed and then kneaded by means of a sand mill:

| | |
|---|---|
| Thermally fusible layer composition | |
| Carnauba wax (mp. 81–85° C.) | 20 parts |
| Toluene | 30 parts |
| Methyl isobutyl ketone | 7.5 parts |
| Ink layer composition | |
| Vinyl chloride/vinyl acetate copolymer (SLEC A manufactured by Sekisui Kagaku K.K.) | 10 parts |
| Carbon black | 15 parts |
| Toluene | 55 parts |
| Methyl ethyl ketone | 22 parts |

Each of the composition obtained above was printed onto a 6 micron polyester film by means of multicolor gravure printing machine so as to give a construction of thermally fusible layer (1.2 microns)/ink layer (1.2 microns)/thermally fusible layer (1.2 microns).

(Thermal transfer material B)

In the above-mentioned thermal transfer composition A, thermally fusible layer composition or ink layer composition was replaced with the following ones:

| | |
|---|---|
| Thermally fusible layer composition | |
| Rice wax (mp. 78–82° C.) | 2.5 parts |
| Carnauba wax | 10 parts |
| Toluene | 30 parts |
| Methyl isobutyl ketone | 12 parts |
| Ink layer composition | |
| Polyamide (Versamide 725, manufactured by Henkel Hakusui Co.) | 15 parts |
| Oil-soluble dye (Zapon Red 335, manufactured BASF) | 15 parts |
| Methyl isobutyl ketone | 50 parts |
| Isopropyl alcohol | 20 parts |
| (Thermal transfer material C) | |

Carnauba wax was coated on a polyester film by means of hot melt coater to form a thermally fusible layer having a thickness of 3 microns, and thereon was formed ink layer (2.0 microns)/thermally fusible layer (1.2 microns) with thermal transfer material A by means of gravure printing machine.

(Themal transfer material D)

A composition was prepared by mixing 60 parts of carnauba wax, 15 parts of petroleum resin and 15 parts of colloidal silica into 100 parts of toluene, adding thereto 10 parts of carbon black, and homogenized the resulting mixture for one hour by means of Red Devil. A polyester film was coated with this composition by means of bar coater and then dried.

| (Thermal transfer material E) | |
|---|---|
| Thermally fusible layer composition I | |
| Carnauba wax (mp. 81–85° C.) | 10 parts |
| Rice wax (mp. 78–82° C.) | 2.5 parts |
| Toluene | 30 parts |
| Methyl isobutyl ketone | 7.5 parts |
| Ink layer composition | |
| Synthetic wax (DIACARNA 30, manufactured by Mitsubishi Kasei Kogyo K.K.) | 9 parts |
| Ethylene/vinyl acetate copolymer | 9 parts |
| Rutile form of titanium white | 27 parts |
| Toluene | 15 parts |
| Methyl isobutyl ketone | 30 parts |
| (The mixture was homogenized with paint shaker for 6 hours.) | |
| Thermally fusible layer composition II | |
| Candelilla wax (mp. 65–72° C.) | 5 parts |
| Carnauba wax | 7.5 parts |
| Toluene | 25 parts |
| Methyl isobutyl ketone | 12 parts |

Each of the compositions thus obtained was printed onto a 6 micron polyester film so as to give a structure of thermally fusible layer I (1 micron)/ink layer (2 microns)/thermally fusible layer II (1 micron).

Using the above-mentioned thermal transfer materials, opaquing was carried out by the procedure shown in FIG. 1. Thus, test object 1 (a lith type film) was fixed under the down surface of glass, and instruction was supplied from the cursor placed on the upper surface of glass. According to the positional information, thermal head shifted to the position to be stopped out where thermal transfer was carried out by the thermal transfer material. Thus, a good opaquing could be practised.

In the work for opaquing the unnecessary light-transmissible or reflecting areas of lith type film or photographic printing paper, the opaquing method of the present invention can realize the following improvement.

Thus, the results given by the opaquing work of the present invention are compared below with those given by the prior opaquing method by the coating of opaque ink.

The present invention: working time 40 seconds

Prior method: working time 12 minutes (the number of objects to be stopped out was 80 in an A4 size lith type film)

As for the quality of opaquing, the invention necessitated no correction so that only one opaquing was enough, while in the prior method some positions must be corected.

Figure 2:
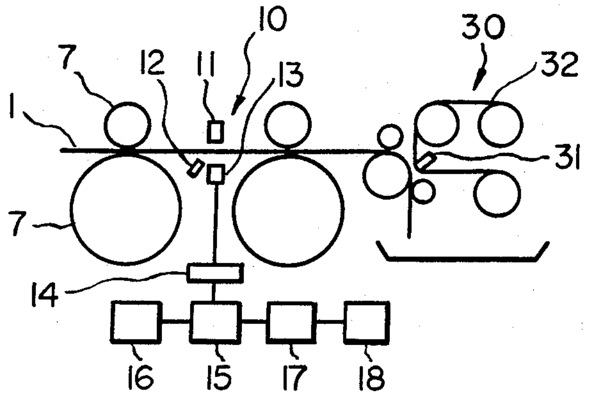
FIG. 2 is an outlined side view illustrating one embodiment of the opaquing apparatus of the invention.

FIG. 2 is an outlined side view illustrating an apparatus in which detection is also automated.

Test object 1 such as lith type film or photographic printing paper or the like is transported to exposing-detecting means 10 by conveying means 7 having belt and roller. The exposing-detecting means 10 is equipped with CCD sensor (detecting means) 13 perpendicularly placed to the direction of conveying with fluorescent lamp or LED array 11 (for transmission) and 12 (for reflection) as illuminating light source (exposing means). Inputting means 16 is connected to CPU 15. Based on the input size and pitch of detection, exposing means 11 or 12 works according to the instruction fed from detection controller 14 via computer 15. The image informations of test object, i.e. the informations fed from detection means, are successively memorized by memory 17 controlled by CPU (computing apparatus) 15. In the apparatus of the invention, CPU is not indispensable, but an apparatus having no CPU is also usable in some cases.

The conveying means 7 works for the purpose of transfer and holding the test object. In this example, a rotary encorder (not shown in the figure) is used for confirming the work. When the amount of informations memorized in memory 17 has reached an amount corresponding to three lines as counted perpendicularly to the direction of conveying, the informations of 4-conjunction picture elements shown in FIG. 4 are compared by means of a comparing device, and the necessary areas sueh as letters and patterns are judged, referring to the predetermined value. When an area is judged as necessary by this comparison-decision work, the corresponding co-ordinate informations ar memorized in submemory 18.

FIG. 3 is an outline diagram illustrating the work for detecting the necessary area and feeding the informations to opaque layer applying means. FIG. 4(A) schematically represents an image area which is originally a necessary area together with positional informations. FIG. 4(B) illustrates unnecessary area.

Next, the comparing work in the comparing device 20 will be mentioned. When B-2 position is watched and the lateral direction, i.e. A-B-C, is taken as scanning line, whether B-2 is necessary area (original image line) or unnecessary area (pinhole or stain) is judged based on the informations of A-1, B-1, B-3 and C-2. If B-2 involves a light-transmissible area or reflecting area and one or more of A-1, B-1, B-3 and C-2 involve light-transmissible or reflecting area, B-2 is judged as a necessary area in FIG. 4 (A). It is also possible to judge that it is a necessary area when neighboring two or more or neighboring three or more involve light-transmissible or reflecting area. In FIG. 4 (B), none of neighboring A-1, B-1, B-3 and C-2 has light-transmissible nor reflecting area. In this case, B-2 is judged as an unnecessary area.

In the above-mentioned example, scanning is carried out be every picture element. On the other hand, when the unit of picture element overlaps the edge of necessary picture line, the picture line is smaller than picture element, so that it may be judged as unnecessary. In order to avoid it, the above-mentioned conjunction method is employed, by which a correct detection can be practised.

The result of comparison in comparing device 20 is sent to the subsequent opaquing part 30. Unless comparing device 20 is involved in CPU15, it is provided as comparing device 20 when CPU15 is not used.

When the conveyed test object reaches opaquing part 30 of FIG. 2, the co-ordinate informations in submemory 18 and the co-ordinate informations of test object under opaquing part 30 are tested by means of and circuit (AND). If the result is not true, opaquing is automatically carried out onto the corresponding co-ordinate position of test object.

In the apparatus of the invention, the pitch of detection may be previously adjusted to "every picture element pitch", "every other picture element pitch", and so on.

The number of picture elements to be referred to for the purpose of identification may be fixed. For example, when the letters constituting test object become greater, a more coarse picture element number may be used than in the detection of finer letters. That is, the number of picture elements per one letter may be the same. Even if the sizes of necessary and unnecessary areas are different from usual sizes, the period of time required for detection and opaquing is the same as in usual case. That is, whether image unit is small (picture, letter) or large, the period of time for treatment is the same, because the number of picture elements to be referred to is the same.

In the invention, the size of picture element can be previously decided. Further, it can be automated by referring to the size of letters on lith type film or the like which are usually treated visually, or the size of letters forming an image such as progressions or points. However, the invention is not limited to these embodiments, but it is also possible to input the size of picture element and pitch of detection by means of keyboard. Recommendably, the size of picture element may be taken as about 400 microns in the case of usual letters. In the detection of image, condition of exposure that is exposure intensity and cyclic change of exposure intensity can also be previously decided. It is effective to change the condition of exposure from the viewpoint of increasing the speed of detection and identification of necessary area. Size of picture element and pitch of detection area input by means of keyboard and the like. The input size is sent to detecting means via CPU. Based on the size input from keyboard, the size of picture element in the invention is calculated by CPU. Further, it is also possible to alter the pitch referred to by CPU and to memorize the size. Usually, detection is carried out by varying the pitch (width) of detection in image detecting apparatus. FIG. 5 illustrates an example in which pitch is altered. In this apparatus, pitch of detection can be previously decided not only by the inputting means but also it can be calculated by means of CPU 15. FIG. 5-I is a case where the pitch of detection is fine. That is, pitch of detection is designated by every picture element. II is a case where pitch of detection is enlarged so that areas expressed by dotted line are not detected. The detection pitch is usually controlled by means of detection controller 14. An apparatus having no detection controller 14 is also possible, where the detection is carried out at a fixed pitch.

Alteration of exposure condition fed to the detecting means is mainly carried out by changing the exposure intensity in the time (conveying) direction shown in FIG. 6. This is effective for realizing a varied extent of detection of element such as pinhole by changing the brightness of light source. Thus, the threshold value of detection on a detected element is dependent on the intensity of the light entering the detected element and the time. Thus, if intensity of exposure is varied according to a predetermined condition, identification of pinhole and original image (letters, etc.) can be practised more easily by utilizing the intensity and time.

Thus, in the graph of FIG. 6, scanning is carried out twice with different exposure intensity, namely with a high intensity in the first scanning and a low intensity in the second scanning. In both the exposures, the area is judged as the original necessary image only when the predetermined threshold value (dotted line) is exceeded. When either one (exposure with weaker light) is lower than the threshold value, the area is judged as unnecessary area, so that it is stopped out. When both the stronger and weaker lights are lower than the threshold value, it is not stopped out, if desired. As the means for varying the intensity of exposure, rotary shutter can be used, for example. Other light controlling devices are also usable.

In FIG. 2, a thermal transfer material is used as the opaquing part 30. It is mainly constituted of thermal head 31 and thermal transfer material 32. Thermal head 31 is perpendicularly placed to the direction of conveying. According to the result of theoretical product of positional informations of submemory 18 and test object, the thermal head is heated and the thermal transfer material is fused and an opaque layer is formed on the detected unnecessary areas. As the thermal transfer material, a material prepared by dissolving 2 parts by weight of oxyethylene/oxypropylene block copolymer into 7 parts by weight of a solvent (isopropyl alcohol and water), adding 1 part by weight of carbon black, shaking the mixture for one hour by means of a shaking machine (Red Devil) to prepare a transfer material, coating a polyethylene terephthalate film with the transfer material by means of No. 16 bar coater, and drying it is used. The temperature of transfer is about 53° C.

A lith type film or the like which has been stopped out with this thermal transfer material was excellent in the adhesive property and abrasion resistance of opaque layer and was completely stopped out light. Accordingly, in the post process, no peeling took place even if it was handled in the same manner as in the prior manual opaquing process.

Although the above-mentioned thermal transfer material is an aqueous material, organic solvent type of ones, such as alcohol type, are also usable. For example, 60 parts by weight of carnauba wax, 15 parts by weight of petroleum resin and 15 parts by weight of colloidal silica were dissolved into 100 parts by weight of toluene, then 10 parts by weight of carbon black was added, the resulting mixture was dispersed for one hour by means of Red Devil, and it was coated by means of bar coater or the like and dried to give a thermal transfer material. Using this transfer material, a transfer was carried out. As the result, a good opaque layer was formed. The temperature of transfer was about 90° C.

Using the above-mentioned thermal transfer materials A, B, C, E opaquing was carried out with an apparatus having an automated detecting means. The results were good.

Next, result of the opaquing work according to the invention will be compared with that of prior opaquing method.

The method of the invention: working time 20 seconds

Coating method using prior opaque ink: working time 12 minutes (objects of opaquing was 80 positions in A4 size lith type film)

As for quality of opaquing, the invention necessitated no correction after only one treatment.

The opaquing method of the invention may also be an ink jet process, an electrophotographic process, and the like.

If desired, water resistance, alcohol resistance and the like is given to these opaque materials, because they can be rubbed with water or alcohol after being provided on lith film or photographic printing paper or the like for the purpose of removing stains. Further, the combination of proper materical used for removing stains and opaque materials can be adopted to this invention. Examples of the material used for removing stains include water-polyoxyethylene sorbitan xenostearate, water-polyoxyethylene stearyl ether, and the like.

As is apparent from the description presented above, the method and apparatus of the present invention enable to improve the working process in a work for opaquing the unnecessary light-transmissible or reflecting areas in lith type films or photographic printing papers or the like.

Thus, the opaquing method is labor-saving, and the works for washing dish, hair-pencil, water box and the like necessary for preliminary preparation of prior works have become unnecessary. Since the opauqe material is provided in the form of sheet or tape, it does not pollute the site of work and enables to treat plural sheets of object continuously. Further, a uniform opaquing work can be practised without any skillful person.

Further, automation of the detecting means has enabled an automatic opaquing work.

What is claimed is:

1. An opaquing method for stopping out extraneous areas other than desired image-constituting areas in a lith type film, photographic printing paper or the like on which an image has been formed, comprising the steps of:

detecting optically responsive areas of the film by scanning successive picture elements in the film, photographic printing paper or the like;

comparing optical responsivity of each picture element with the optical responsivity of adjacent picture elements in a scan line of the picture element and in adjacent scan lines;

determining the presence of an extraneous area having a picture element with optical responsivity different to the optical responsivity of adjacent picture elements; and forming an opaque layer on extraneous areas other than said desired areas in said lith type film, photographic printing paper or the like.

2. An opaquing method according to claim 1, wherein said forming step is accomplished by use of a thermal transfer recording apparatus.

3. An opaquing method according to claim 1, wherein said comparing step is accomplished by providing a two-dimensional array of picture elements about a picture element selected for comparison.

4. An opaquing apparatus for stopping out extraneous areas other than image-constituting light-transmissible or light-reflecting desired areas in a lith type film, photographic printing paper or the like on which an image has been formed, comprising:

an exposing means for exposing said lith type film, photographic printing paper or the like to light;

a detecting means for detecting said desired areas at a pitch commensurate with picture element unit;

an opaque layer means for providing an opaque layer on the extraneous area other than said desired areas; and comparing means operative with an array of picture elements for comparing the picture element of an extraneous area with adjacent picture elements to determine the presence of an extraneous area, said comparing directing said opaquing means to provide the opaque layer.

5. An opaquing apparatus according to claim 4, further comprising a conveying means for conveying said lith type film, photographic printing paper or the like to the exposing means, said detecting means and said opaque layer providing means.

6. An opaquing apparatus according to claim 4, wherein said opaque layer providing means is operative to form on the extraneous areas an opaque layer by adding to an extraneous area a predetermined number of picture elements as an edge.

7. An apparatus according to claim 4, wherein said detecting means is operative to detect at a preselectable pitch at an intergral number of picture elements.

* * * * *